Dec. 16, 1969    J. H. GRENIER    3,484,140
ENDLESS TRACK FOR VEHICLE
Filed May 27, 1968    2 Sheets-Sheet 1
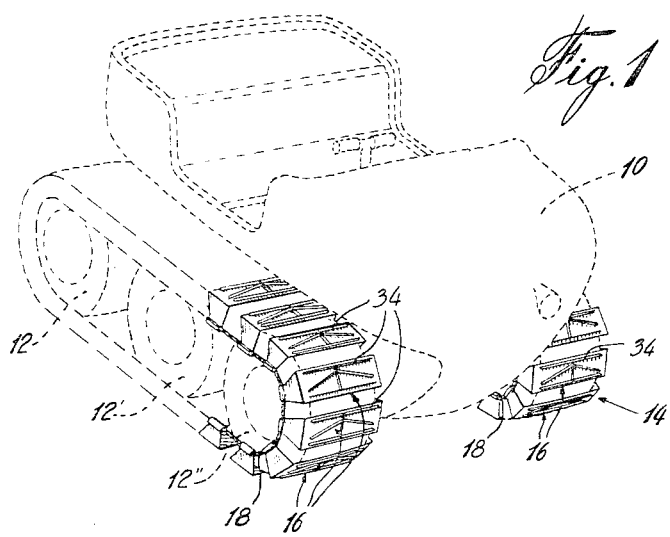
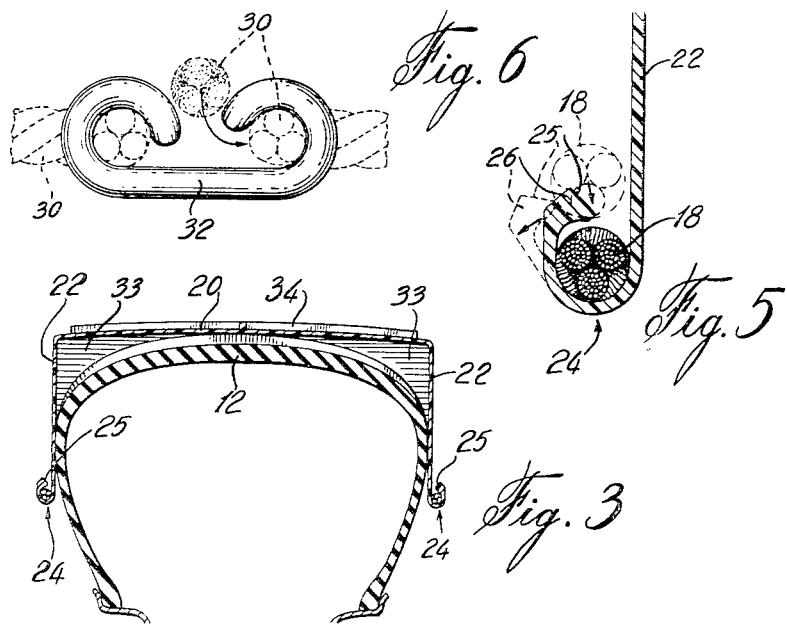
INVENTOR
Joseph Henri GRENIER
ATTORNEY

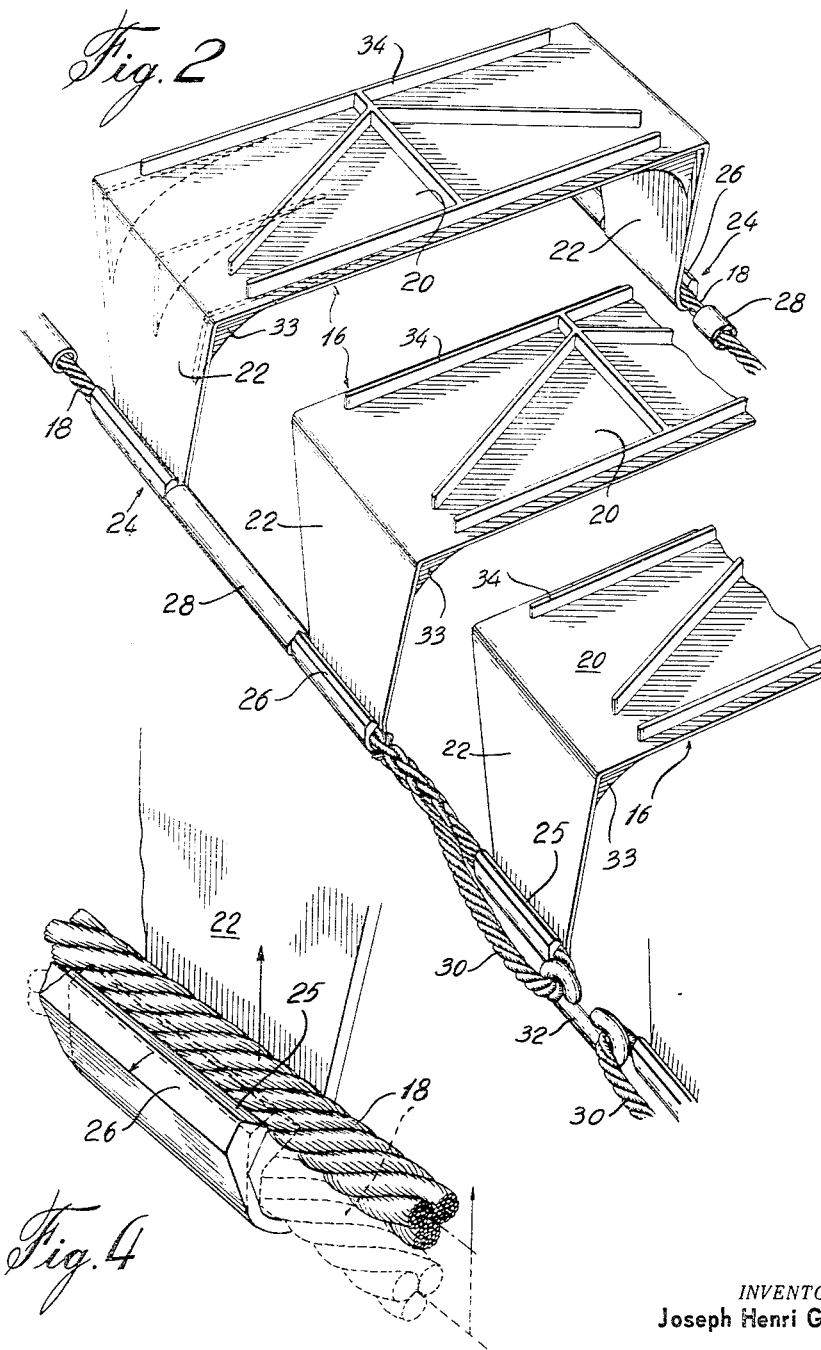

United States Patent Office 3,484,140
Patented Dec. 16, 1969

3,484,140
ENDLESS TRACK FOR VEHICLE
Joseph Henri Grenier, 220 Grande Allee, Apt. 295,
Quebec, Quebec, Canada
Filed May 27, 1968, Ser. No. 732,283
Int. Cl. B62d 55/18, 55/24
U.S. Cl. 305—35                8 Claims

ABSTRACT OF THE DISCLOSURE

An endless track for crawler-type vehicle made of a plurality of successive cleats each having a flat rectangular base and two depending sidewalls substantially perpendicular with the base, the free end of each sidewall is provided with a longitudinally slotted channel to receive a cable to connect the successive cleats in an endless circuit.

BACKGROUND OF THE INVENTION

Field of the invention

The present invention relates to a crawler-type vehicle and in particular to an endless track for such vehicle.

Description of the prior art

Previous tracks for crawler-type vehicles were generally made of rubber or metal. Each rubber track for a crawler-type vehicle was twenty-three pounds, which makes forty-six pounds for a pair of tracks, and if such tracks are made of steel or metal, it is even heavier. The present track for the same crawler-type vehicle weighs about eight and a half pounds, which makes 17 pounds for the pair of tracks. The reduction of weight is very important because the applicant intends to use in part the present track on amphibious vehicles. It was impractical to build rubber or metal tracks because amphibious vehicles tended to sink. These vehicles were also requiring a high power motor because a low power motor could not be expected to travel very fast with rubber or metal tracks.

SUMMARY OF THE INVENTION

The invention is directed to an endless track for a crawler-type vehicle having at least a front wheel and a rear wheel, and which comprises a plurality of successive cleats independent of one another arranged to form an endless circuit, each cleat is formed of a generally flat ground engaging portion and sidewalls depending therefrom, two endless cables, means to connect the free ends of said depending sidewalls on each side of the cleats to one of said cables, so that the successive cleats are adapted to extend peripherally from the front wheel to the rear wheel.

An important characteristic of the invention is to provide a track made of cleats, each cleat being removably mounted on a pair of cables; this is obtained without disturbing any of the adjacent cleats and without the use of a tool.

Previous tracks made of rubber or metal were known to accumulate snow or ice on their surfaces. The cleats used in the present track are made of plastic and in particular of polypropylene to which a quantity of nylon has been added. Such a combination of plastic has a high tensile resistance and snow, ice or mud cannot easily adhere to its surface.

BRIEF DESCRIPTION OF THE DRAWINGS

FIGURE 1 is a perspective view of the new endless tracks on a crawler-type vehicle;

FIGURE 2 is an enlarged view of three adjacent cleats connected to a cable according to the present invention;

FIGURE 3 is a cross-sectional view illustrating a cleat mouted over a tire;

FIGURE 4 is a perspective view of the gripping arrangement between the cable and the cleat;

FIGURE 5 is a cross-sectional view of the cable in the channel of the cleat;

FIGURE 6 is a plan view of a cable snap to hold the two ends of a cable.

DESCRIPTION OF THE PREFERRED EMBODIMENT OF THE INVENTION

FIGURE 1 illustrates a vehicle 10 adapted to roll on six tires, constituted of pairs of tires 12, 12' and 12". In order to improve its operation on snow, water or in swampy grounds, an endless track 14 is mounted over the wheels. The track 14 is made of a plurality of successive cleats 16 which are connected to each other by a cable 18 adapted to travel about the side of the wheels 12, 12' and 12".

Each cleat is made of a substantially flat rectangular surface 20 which travels in contact with the tread portion of the wheels 12. Two sidewalls 22 are pending from the surface 20 at substantially 90° with the rectangular surface 20. The free end of the sidewalls 22 forms a channel 24 which is substantially cylindrical and slightly opened along its length. As shown in FIGURE 5, the channel substantially extends around the cable 18 in the form of an open loop, the end portion of the said loop increasing in thickness in order to hold the cable inside the channel even under additional strain exerted in particular when the vehicle turns around a corner. The upper edge 25 of the channels 24 are sloping inwardly to facilitate the introduction of the cable inside the loop.

The sidewalls 22 of each cleat taper downwardly from the surface 20 down to the channel 24. The space on the cable between the channels 24 of two adjacent cleats is filled with a sleeve 28 so as to slightly space each cleat and keep each one of them in their relative position.

The endless cable 18 is usually a linear cable which has a closed loop 30 at each end, both of said closed loops being tied together by a hook 32 having a double eyelet which permits to snap the cables therein.

The rigidity of the cleats is increased by inwardly projecting ribs 33. These ribs have a curved edge substantially similar to the curvature of the tires on which it will rest when passing under the tires.

The gripping power of the track is improved by projecting ridges 34 on the outer portion of the flat rectangular surfaces 20. These ridges may have a variety of designs which do not constitute the purport of this invention.

The installation of this track is very easily made. The rear or front tires 12, or 12" on each side are deflated sufficiently so that the track 14 may be installed over the said wheels. After this operation, the rear or front tires are inflated on each side to their normal pressure and the vehicle is ready to go.

The maintenance of this track is very simple because each cleat 16 may be manually removed from the cables 18 and reinstalled without any tool. As shown in FIGURES 4 and 5, the end 26 of the channel resiliently covers the cable 18 and may be gripped by the hand of the operator for removing the cable located in the channel. The additional thickness of the end of the loop 26 is provided for increasing the retaining power of the cable into the channel.

The cleats are made with a strong flexible, wear-resistant plastic such as polypropylene or preferably a mixture of polypropylene and nylon. This mixture is selected because ice or snow or mud will not adhere easily onto its surface. The cable is made of a material having a high tensile strength. For this purpose, polypropylene is also selected.

The track according to the present invention is preferably made of plastic because it has been contemplated particularly for low power vehicles for which a too heavy track would be a hindrance to the speed and maneuverability of the vehicle. Furthermore, because these vehicles are not expected to be driven by persons having any important amount of mechanical knowledge or skill, the removing and replacing of a cleat will not require any tool or any technical abilities.

I claim:

1. An endless track for a vehicle with at least a front wheel and a rear wheel, the said track comprising
a plurality of successive cleats independent of one another arranged to form an endless circuit,
each cleat formed of a generally flat ground engaging portion and sidewalls depending therefrom,
two endless cables, one along each sidewall,
a channel forming member integrally connected to the free end of the sidewall for receiving a portion of the cable, the said channel forming member being made of a resilient material and provided with a longitudinal entrance slot narrower than the cross-section of the cable, so as to resiliently grip while permitting manual release of the cable from said channel forming member by widening said slot, the free end of the channel forming member, along the slot, having an increased thickness.

2. An endless track as recited in claim 1, wherein the free end of the channel having an increased thickness has an edge sloping inwardly towards the opposite edge of the slot so as to facilitate the introduction of the cable in the channel.

3. An endless track as recited in claim 1, comprising ribs connected to and at the intersection of the ground engaging portion and the sidewalls for increasing the rigidity of the cleats.

4. An endless track as recited in claim 1, wherein the ground engaging portion is substantially rectangular and the two sidewalls are tapering down towards the channel.

5. An endless track as recited in claim 1, wherein the cleats are spaced apart and spacer sleeves mounted on the cables between the channels to maintain the spacing therebetween.

6. An endless track as recited in claim 1, wherein the cleats are made of resilient plastic.

7. An endless track as recited in claim 1, wherein the endless cable is a rectilinear cable having a closed loop at both ends interconnected by a hook.

8. An endless track as recited in claim 1, wherein the slots of the channels extend on the outer portion of the sidewalls.

References Cited

UNITED STATES PATENTS

| | | | |
|---|---|---|---|
| 1,215,301 | 2/1917 | Munson | 305—40 X |
| 2,179,587 | 11/1939 | Deardorff | 305—40 X |
| 2,314,295 | 3/1943 | Wampfler | 305—56 X |
| 3,387,896 | 6/1968 | Sobota | 305—40 X |

RICHARD J. JOHNSON, Primary Examiner

U.S. Cl. X.R.

305—40